United States Patent
Deli

(10) Patent No.: US 8,137,013 B2
(45) Date of Patent: Mar. 20, 2012

(54) ELECTROMAGNETIC SHUTTER FOR IMAGING SENSORS

(75) Inventor: Josef Deli, Carmiel (IL)

(73) Assignee: Opgal Optronic Industries Ltd., Carmiel (IL)

( * ) Notice: Subject to any disclaimer, the term of this patent is extended or adjusted under 35 U.S.C. 154(b) by 0 days.

(21) Appl. No.: 12/532,735

(22) PCT Filed: Mar. 27, 2008

(86) PCT No.: PCT/IL2008/000421
§ 371 (c)(1),
(2), (4) Date: Jan. 6, 2010

(87) PCT Pub. No.: WO2008/120195
PCT Pub. Date: Oct. 9, 2008

(65) Prior Publication Data
US 2010/0119222 A1     May 13, 2010

Related U.S. Application Data

(60) Provisional application No. 60/920,809, filed on Mar. 30, 2007.

(51) Int. Cl.
*G03B 9/36* (2006.01)
(52) U.S. Cl. .......................... 396/491; 396/487; 396/489
(58) Field of Classification Search .......... 396/463–464, 396/467–468, 493–494
See application file for complete search history.

(56) References Cited

U.S. PATENT DOCUMENTS

| | | | | |
|---|---|---|---|---|
| 4,024,552 A | * | 5/1977 | Kondo | 396/464 |
| 4,033,693 A | * | 7/1977 | Payrhammer et al. | 355/71 |
| 4,051,499 A | * | 9/1977 | Kondo | 396/464 |
| 4,286,856 A | * | 9/1981 | McGrath | 396/470 |
| 4,514,064 A | | 4/1985 | Kurosu et al. | |
| 4,839,679 A | * | 6/1989 | Cameron et al. | 396/469 |
| 4,890,129 A | | 12/1989 | Mody | |
| 5,706,120 A | * | 1/1998 | O'Brien et al. | 359/230 |
| 5,802,415 A | * | 9/1998 | Bryant et al. | 396/469 |
| 5,828,920 A | * | 10/1998 | Stephany et al. | 396/463 |

(Continued)

FOREIGN PATENT DOCUMENTS

JP    53139527 A   *   12/1978

(Continued)

OTHER PUBLICATIONS

Examination Report Dated Apr. 13, 2010 From the Intellectual Property Office of Singapore Issued by the Austrian Patent Office Re. Application No. 200906227-4.
International Preliminary Report on Patentability Dated Dec. 5, 2010 From the International Bureau of WIPO Re. Application No. PCT/IL2008/000421.

(Continued)

*Primary Examiner* — Clayton E Laballe
*Assistant Examiner* — Leon W Rhodes, Jr.

(57) ABSTRACT

A shutter mechanism for an optical system includes a linear track having a first end and a second end, a first magnetic assembly located adjacent the first end of the track and a second magnetic assembly located adjacent the second end of the track, the two magnetic assemblies arranged in opposite polarities. A shutter plate is provided coupled to a coil mounted on and movable across the track. When a direct electric current is passed through the coil in one direction the shutter is forced to move to the first end of the track, whereas when a direct electric current is passed through the coil in an opposite direction the shutter is forced to move to the second end of the track.

17 Claims, 4 Drawing Sheets

U.S. PATENT DOCUMENTS

| | | | |
|---|---|---|---|
| 6,394,668 B1 | 5/2002 | Nakano | |
| 6,836,201 B1 * | 12/2004 | Devenyi et al. | 335/229 |
| 2005/0180275 A1 | 8/2005 | Shiraki et al. | |

FOREIGN PATENT DOCUMENTS

| | | |
|---|---|---|
| JP | 07 131967 | 5/1995 |
| JP | 07-131967 | 5/1995 |
| JP | 2003 059020 | 2/2003 |
| JP | 2003-059020 | 2/2003 |

OTHER PUBLICATIONS

International Search Report and the Written Opinion Dated Dec. 5, 2010 From the International Searching Authority Re. Application No. PCT/IL2008/000421.

Deli.

International Search Report for International Application No. PCT/IL2008/000421 mailed Sep. 16, 2008.

* cited by examiner

ELECTROMAGNETIC SHUTTER FOR IMAGING SENSORS

CROSS-REFERENCE TO RELATED APPLICATIONS

This application is a National Phase Application of PCT International Application No. PCT/IL2008/000421, entitled "Electromagnetic Shutter for Imaging Sensors", International Filing Date Mar. 27, 2008, published on Oct. 9, 2008 as International Publication No. WO 2008/120195, which in turn claims priority from U.S. Provisional Patent Application No. 60/920,809, filed Mar. 30, 2007, both of which are incorporated herein by reference in their entirety.

FIELD OF THE INVENTION

The present invention relates to imaging. More particularly it relates to an electromagnetic shutter for imaging sensors.

BACKGROUND OF THE INVENTION

In optical systems, and in particular in imaging systems, such as thermal cameras, it is needed to provide a shutter that can be placed in front of the imaging sensor and block its view when desired. In an Infra-Red (IR) camera a shutter is provided for occasional calibration of the imaging sensor, or for preventing undesired irradiation from reaching the imaging sensor.

Calibration is necessary in thermal sensors in order to ensure accurate measurements and to obtain correct images. Calibration is especially important in IR cameras, which have a thermal sensor that is not cooled to supercool temperatures.

Every once in a while a uniform surface of a black body is placed in front of the sensor and the sensor matrix is calibrated to measure a surface of uniform temperature.

There are known IR cameras, which include such an optical shutter. Typically the shutter comprises a black painted plate, which is displaced between two positions in front of the sensor—a blocking position in front of the sensor view and a retracted position, where the shutter is removed from the sensor's field of view.

A known shutter mechanism includes a shutter plate turning about a motor axis to and out of the blocking position. Another shutter mechanism includes a shutter plate coupled to a motor with linear transmission so as to facilitate linear motion of the shutter between the two positions.

In some cases it is desired to have a shutter mechanism that is silent in order to prevent exposing the existence and location of the imaging system.

It is an object of the present invention to provide a shutter mechanism for imaging systems, which electromechanically activated.

Another object of the present invention is to provide a shutter mechanism for imaging systems, which is silent.

Yet another object of the present invention is to provide a shutter mechanism for imaging systems, which is reliable, holding the shutter plate in either of its positions firmly and stably.

Other advantages and objects of the present invention will become apparent after reading the present specification and reviewing the accompanying figures.

SUMMARY OF THE INVENTION

A shutter mechanism for an imaging system, which is electromagnetically operated, and which is silent and reliable.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

The present invention introduces a shutter mechanism that has a low profile (small dimensions), which is electromagnetically actuated, and is silent (or at least does not produces a noticeable noise when operated) and highly reliable. The shutter travels linearly along a straight track.

In principle a shutter mechanism according to the present invention comprises a shutter plate, which is coupled to an electromagnetic coil chip that can travel linearly between to positions across a confined track. On either ends of the track a magnet assembly is placed, in opposing magnetic polarities. When an electric (direct) current is passed through the coil the induced magnetic field of the coil aligns with one magnetic assembly and opposes the magnetic polarity of the other magnetic assembly, so that the chip is either attracted by one magnetic assembly and repelled by the other or repelled by the first magnetic assembly and attracted by the other, forcing the chip and hence forcing the shutter to move from one end of the track to the other in a predetermined manner, governed by the direction of the induced electromagnetic field of the coil, which is controlled.

Figure 1:
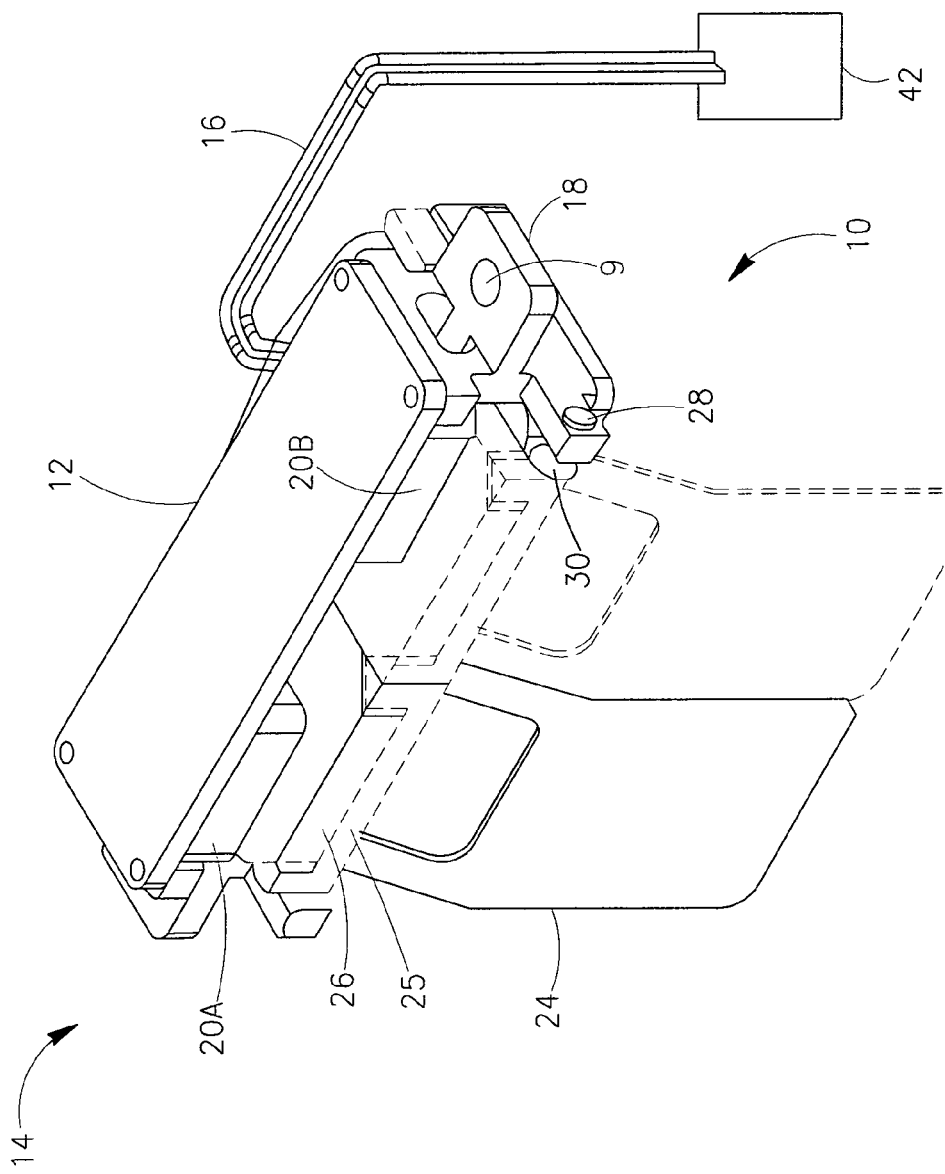
FIG. 1 illustrates an electromagnetic shutter mechanism assembly for an optical system, in accordance with a preferred embodiment of the present invention.

Reference is made to FIG. 1, illustrating an electromagnetic shutter mechanism assembly, indicated by numeral 10, for an optical system, in accordance with a preferred embodiment of the present invention. The shutter mechanism assembly comprises a shutter 24, which is a plate whose color is black for absorbing light and acting as a black body. The shutter plate 24 is coupled to bar 25 (which may form an integral part, or assembled together), which can ride across rod 28 forming a track (a substantially parallel rod 28 is provided opposite this rod). The track is placed between two opposite cover plates 12 and is confined between two opposing end walls 18. A pair of opposite facing magnets is provided on either side of the track (shown are only the top magnets of each pair, designated 20A and 20B, the opposing magnets 22A and 22B shown in FIG. 2), the two magnets of each pair aligned with respect to their magnetic polarity (both same direction), the magnet pairs arranged in opposing magnetic polarities. An electromagnetic coil (see also FIG. 3), formed on a chip 26 is provided, coupled to bar 25 of the shutter 24 (in the embodiment shown in this Figure the bar is provided with a groove into which the edge of chip 26 matchingly fits). Washer 30 is provided on either sides of each track rod 28, preferably made from an elastic material serving as a damper to absorb some of the kinetic energy of the shutter when it bumps into it, so as to reduce or totally eliminate impact noise. Alternatively (or in addition) an elastic bumper can be placed on either ends of the track attached internally on end walls 18. The washers also serve to distinctly mark the end of the track and their predetermined dimensions facilitate accurate positioning of the shutter on either end.

Extension of end wall 18 with bore 9 is provided for fastening the shutter mechanism assembly in a desired position by screws or pins.

Figure 2:
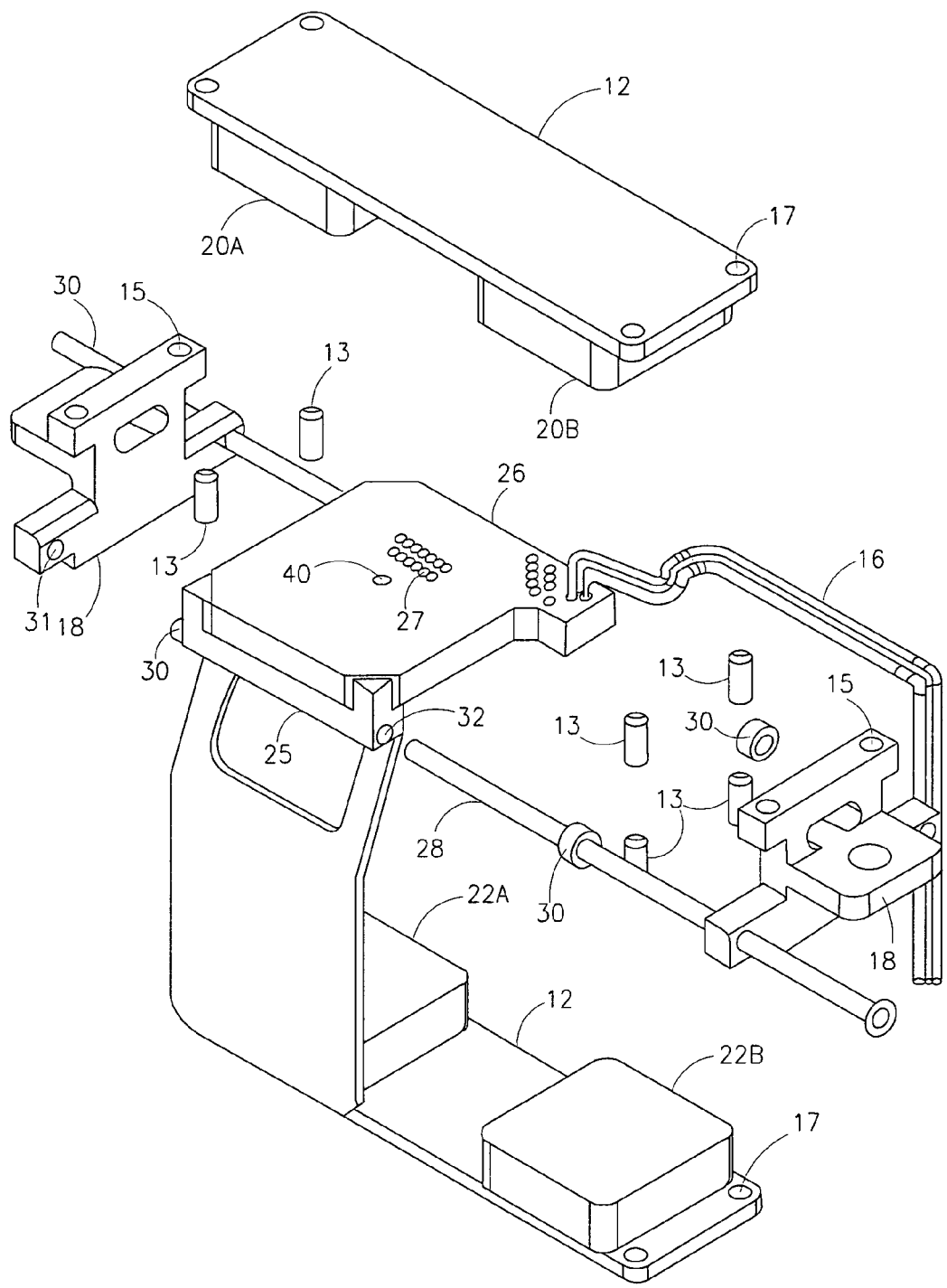
FIG. 2 illustrates an exploded view of the electromagnetic shutter mechanism shown in FIG. 1.

FIG. 2 illustrates an exploded view of the electromagnetic shutter mechanism shown in FIG. 1. Cover plates 12 are provided with bores 17 through which pins (or screws) 13 are inserted passing into bores 15 of end walls 18, thus rigidly forming a housing for the track. Bar 25 is provided with bore 32 across into which rod 28 is inserted and on which bar 25 may ride, and the ends of each rod 28 are inserted in bores 31 of end walls 18. While bar 25 rides across one of the rods 28, chip 26, which is coupled to bar 25, sits and rides over both rods.

A ferroelectric element 40 is provided on chip 26, so that when the chip resides between either of the magnet pairs it is held firmly due to the magnetic forces, which act on the ferromagnetic element. This facilitates holding the shutter on either sides of the track firmly and stably, while maintaining the electromagnetic coil idle (no current is passed through the coil).

When current is passed through the coil it is repelled by one magnet assembly and repelled by the other, forcing the shutter to move to the one end of the track whereas when the current through the coil is reversed the shutter is forced to move to the opposite end of the track.

Figure 3:
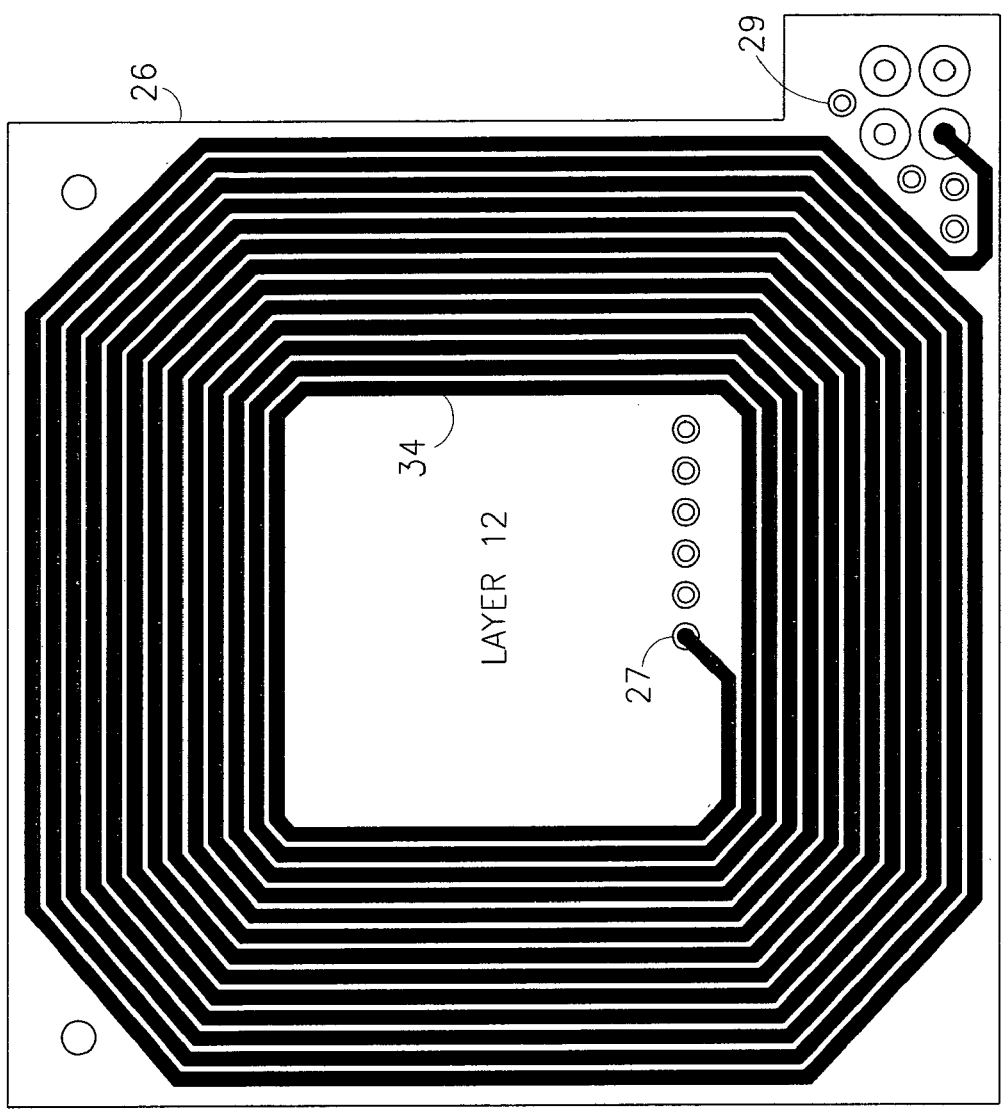
FIG. 3 illustrates one layer of a multi-layer electromagnetic coil chip, suitable for incorporation in an electromagnetic shutter mechanism according to a preferred embodiment of the present invention.

FIG. 3 illustrates one layer of a multi-layer electromagnetic coil chip 26, suitable for incorporation in an electromagnetic shutter mechanism according to a preferred embodiment of the present invention. A multi-layer coil is formed in order to gain a electromagnetic field that is sufficient to influence the chip to move across the track. Each layer comprises a spiral conductive element 34 embedded in that layer and insulated from spiral conductive elements of adjacent layers. Contacts 27 and 29 facilitate inter-layer electrical connection between the spiral elements 34. Electrical wires 16 (see FIG. 1 and FIG. 2) are used to supply electrical current to the coil. In one alternative embodiment of a multi-layer electromagnetic coil chip, according to a preferred embodiment of the present invention, all of the coils (of all layers) are designed to induce an electromagnetic field in the same direction, and the shutter is driven from one end of the track to the opposite end by switching the electric polarity of the coil assembly. In an alternative embodiment some of a second coil assembly is provided on the chip, whose induced electric field is opposite to the first one, in which case in order to change the induced electromagnetic field of the chip the coil assemblies are operated alternately.

A proposed operation scheme comprises generating electric pulse of predetermined duration in a predetermined direction (by a controller 42, see FIG. 1) so as to force the shutter to move in a desired direction and move to a chosen end of the track, and then a substantially shorter pulse of reversed electrical polarity to induce counter forces and reduce the kinetic energy of the shutter and chip and cause an inhibited impact on the end wall 18, thus eliminating, or greatly reducing impact noises. Same sequence, but with reversed polarity is applied when it is desired to move the shutter to the other end of the track.

Figure 4:
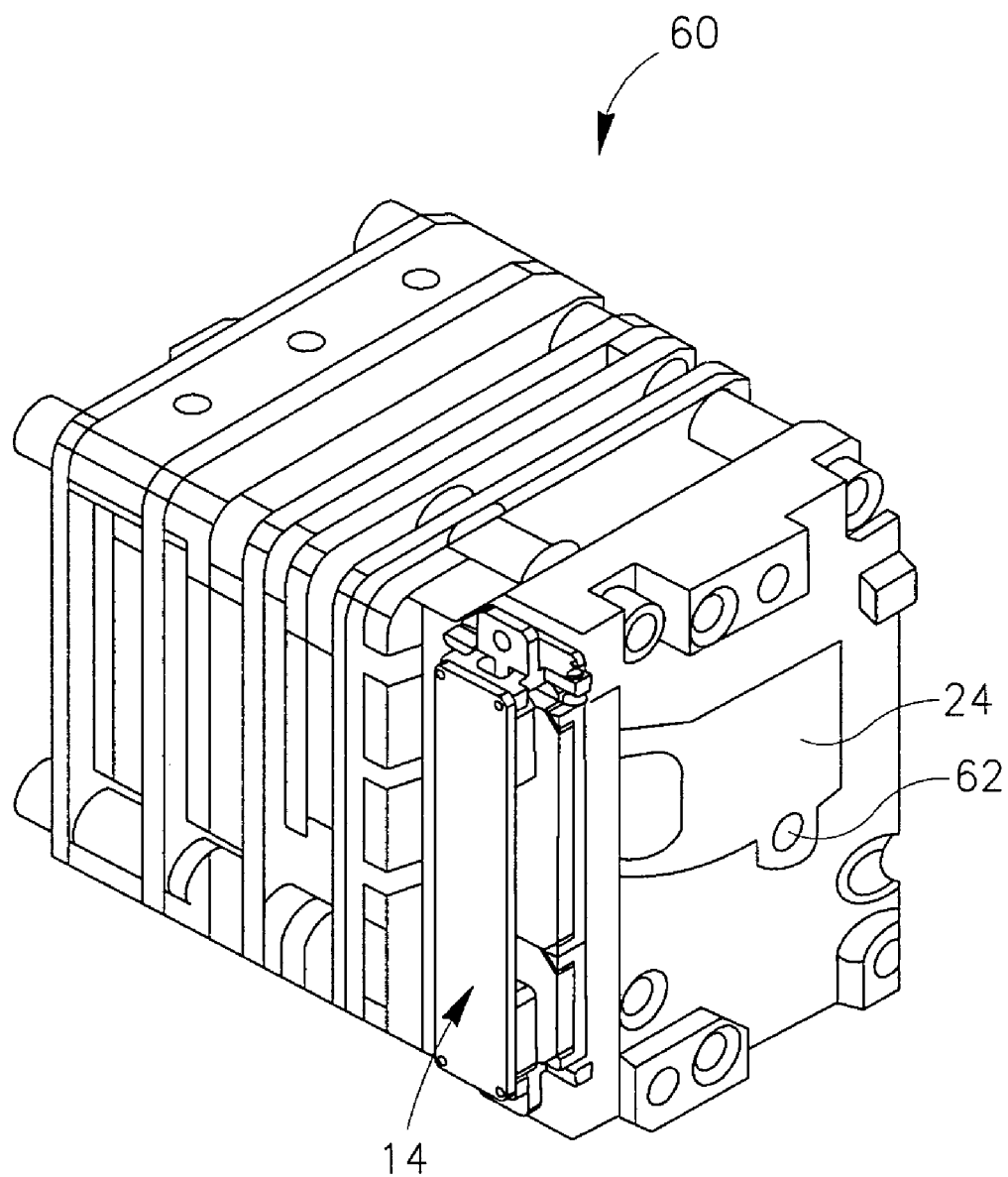
FIG. 4 illustrates an IR camera with an electromagnetic shutter mechanism, in accordance with a preferred embodiment of the present invention.

FIG. 4 illustrates an IR camera 60 with an electromagnetic shutter mechanism 10, in accordance with a preferred embodiment of the present invention. The shutter 24 is placed in front of the imaging sensor and in a first position covers the field of view of the sensor and in a second position is retracted so that it does not obstruct the field of view of the sensor. Magnet element 62 is optionally provided, aimed at cooperate with a hall-effect sensor, which is capable of identifying the presence of the magnetic element in position, and if it moves (due to shakes or jolts) electric current is passed through the coil to force the shutter back in place.

The shutter mechanism of the present invention is made to maintain a low-profile and takes up very small space, relatively to other shutter assemblies. It is a very accurate and reliable mechanism.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A shutter mechanism for an optical system, the shutter mechanism comprising:
    a linear track having a first end and a second end;
    a first magnetic assembly located adjacent the first end of the track and a second magnetic assembly located adjacent the second end of the track, the two magnetic assemblies arranged in opposite polarities;
    a shutter plate coupled to a coil mounted on and movable across the track, said coil comprising a multi-layered coil being at an angle to said plate, whereby when a direct electric current is passed through the coil in one direction the shutter is forced to move to the first end of the track, whereas when a direct electric current is passed through the coil in an opposite direction the shutter is forced to move to the second end of the track.

2. The shutter mechanism as claimed in claim 1, wherein the shutter plate comprises a black-colored plate.

3. The shutter mechanism as claimed in claim 1, wherein the shutter plate is coupled to a bar, which is adapted to ride across a rod forming the track.

4. The shutter mechanism as claimed in claim 1, wherein the track is provided in a housing.

5. The shutter mechanism as claimed in claim 4, wherein the housing comprises two substantially opposite cover plates, the track confined by two substantially opposing end walls.

6. The shutter mechanism as claimed in claim 1, wherein the magnetic assemblies comprise, each, a pair of substantially opposite magnets whose magnetic polarity is aligned substantially in the same direction.

7. The shutter mechanism as claimed in claim 1, wherein the coil comprises a coil formed on a chip.

8. The shutter mechanism as claimed in claim 1, wherein a damper is provided on either sides of the track.

9. The shutter mechanism as claimed in claim 8, wherein the damper comprises a washer.

10. The shutter mechanism as claimed in claim 1, wherein a ferromagnetic element is coupled to the coil.

11. The shutter mechanism as claimed in claim 1, wherein all coil layers are designed to induce an electromagnetic field in substantially same direction.

12. The shutter mechanism as claimed in claim 1, wherein the coil is provided with a first coil assembly and a second coil assembly, the electromagnetic field induced by the first coil assembly being substantially opposite to the electromagnetic field induced by the second coil assembly.

13. The shutter mechanism as claimed in claim 1, further provided with a controller for controlling timing, duration and direction of the electric current through the coil.

14. The shutter mechanism as claimed in claim 1, incorporated with and placed in front of an imaging sensor.

15. A method for providing accurate and synchronized optical shutter the method comprising: providing a shutter mechanism for an optical system, the shutter mechanism comprising:
  a linear track having a first end and a second end;
  a first magnetic assembly located adjacent the first end of the track and a second magnetic assembly located adjacent the second end of the track, the two magnetic assemblies arranged in opposite polarities;
  a shutter plate coupled to a coil mounted on and movable across the track, said coil comprising a multi-layered coil being at an angle to said plate;
  passing a direct electric current through the coil in one direction thus forcing the shutter to move to the first end of the track; and
  passing a direct electric current through the coil in an opposite direction thus forcing the shutter to move to the second end of the track.

16. The method as claimed in claim 15, wherein said passing the direct electric current in said one and opposite directions comprises passing the respective electric current in the form of an electric pulse of predetermined duration in the respective direction.

17. The method as claimed in claim 16, wherein the electric current in the respective direction comprises a pulse of reversed electric polarity and shorter than earlier pulses.

* * * * *